(12) United States Patent
Li et al.

(10) Patent No.: US 9,325,442 B2
(45) Date of Patent: Apr. 26, 2016

(54) EXTERNALLY CONNECTED TIME PORT CHANGEOVER METHOD AND DEVICE

(75) Inventors: Xiaoxia Li, Shenzhen (CN); Hailiang Zhan, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 356 days.

(21) Appl. No.: 14/116,393

(22) PCT Filed: Mar. 20, 2012

(86) PCT No.: PCT/CN2012/072615
§ 371 (c)(1),
(2), (4) Date: Nov. 8, 2013

(87) PCT Pub. No.: WO2012/152124
PCT Pub. Date: Nov. 15, 2012

(65) Prior Publication Data
US 2014/0098827 A1    Apr. 10, 2014

(30) Foreign Application Priority Data

May 9, 2011    (CN) .......................... 2011 1 0118550

(51) Int. Cl.
*H04J 3/06* (2006.01)
*H04L 12/24* (2006.01)
*H04L 12/40* (2006.01)

(52) U.S. Cl.
CPC ............ *H04J 3/0638* (2013.01); *H04J 3/0641* (2013.01); *H04L 41/0654* (2013.01); *H04J 3/0644* (2013.01); *H04J 3/0658* (2013.01); *H04L 12/40176* (2013.01)

(58) Field of Classification Search
None
See application file for complete search history.

(56) References Cited

U.S. PATENT DOCUMENTS

| 7,486,610 B1 * | 2/2009 | Bhupalam ........... H04L 12/4641 370/216 |
| 7,664,018 B2 * | 2/2010 | Warren ................. H04L 12/433 370/230 |
| 7,688,802 B2 * | 3/2010 | Gonia ................... H04J 3/0641 370/328 |

(Continued)

FOREIGN PATENT DOCUMENTS

| CN | 101051887 A | 10/2007 |
| CN | 101667909 A | 3/2010 |

(Continued)

*Primary Examiner* — Redentor Pasia
(74) *Attorney, Agent, or Firm* — Porter, Wright, Morris & Arthur, LLP

(57) ABSTRACT

Disclosed are externally connected time port changeover method and device. The method includes: a node serving as a GM node transmitting time information via a first externally connected time port of the node; if the first externally connected time port fails, the node updating current node priority and GM node priority of the node as preset node priority which is node priority configured for the node when the node is activated; and the node judging whether a second externally connected time port of the node is up and the priority of the second externally connected time port is higher than the current GM node priority, if so, activating the second externally connected time port to transmit the time information. The problem that when the currently selected time access port has failed, changeover among ports cannot be completed in time is solved, thus improving the stability of the time synchronization network.

20 Claims, 4 Drawing Sheets

(56) References Cited

U.S. PATENT DOCUMENTS

| | | | | |
|---|---|---|---|---|
| 7,933,198 | B1* | 4/2011 | Pan | H04L 45/586 370/216 |
| 8,432,788 | B2* | 4/2013 | Abdulla | G06F 11/2005 370/217 |
| 2006/0209677 | A1* | 9/2006 | McGee | H04L 12/44 370/216 |
| 2007/0288585 | A1* | 12/2007 | Sekiguchi | G06F 11/2038 709/209 |
| 2010/0100762 | A1* | 4/2010 | Carlson | H04L 12/6418 714/4.1 |
| 2010/0149980 | A1* | 6/2010 | Cheung | H04Q 3/0087 370/235 |

FOREIGN PATENT DOCUMENTS

| | | |
|---|---|---|
| CN | 101848193 A | 9/2010 |
| CN | 102170398 A | 8/2011 |

* cited by examiner

EXTERNALLY CONNECTED TIME PORT CHANGEOVER METHOD AND DEVICE

TECHNICAL FIELD

The disclosure relates to the field of communications, and in particular, to an externally connected time port changeover method and device.

BACKGROUND OF THE INVENTION

With the rapid development of communication networks, the synchronization requirements of the networks are higher and higher. Being able to extract a real-time time from each node of the network means a lot to the application and maintenance of the network. Especially in the significant promotion of the current 3GPP (Third Generation Partnership Project) technology, the mobile data service is increasing rapidly, which further proposes higher requirements on the data service support ability of the bearer network. The service provision of various 3GPP networks depends on high precision time synchronization in the network to different degrees.

Currently, the time synchronization method used in the existing network is mainly to provide a GPS (Global Positioning System) receiving device in each node of the network and perform precise time service depending on the GPS system. However, when using this method, not only the cost and the construction difficulty are high, but also the security cannot be ensured since the entire network depends entirely on the GPS system of America.

Based on the above reasons, the prior art usually employs the manner of combining high precision time protocol IEEE1588 protocol with GPS to realize the time synchronization of the network. This method requires adding of some network resources in the original network system to run the time synchronization protocol. In addition, it is further required to provide an external time source in a node, and then this node is used as a GM (GrandMaster) node of the network, the GM node provides a time service for the entire network by setting the GPS receiver, and various nodes in the network send a PIP (Precision time Protocol) message to each other by running the IEEE1588 protocol, in order to realize synchronization of the slave nodes to the master node and finally realize the time synchronization of the entire network. This method can provide network time synchronization for remote time synchronization devices. At the same time, when the GPS system is not secure enough, it can be changed over to other external time sources in time, which ensures the security of the network to a great extent, and therefore, it can be promoted rapidly in the development of time synchronization.

Now, during application, the operator further proposes that the GM node introduces the 1 PPS (1 Pulse Per Second) signal and TOD (Time Of Date) time information acquired from the GPS system via the GPS port and FE (Fast Ethernet) port. However, since only one of the two ports can be in an operating state, once the current operating port has failed, there is still no effective solution proposed in the prior art about how to change over to another port to introduce time information, thus being unable to realize the effective changeover of the externally connected time port.

SUMMARY

The disclosure provides an externally connected time port changeover method and device, so as to at least solve the problem in the related art that the effective changeover of the externally connected time port cannot be realized.

According to one aspect of the disclosure, an externally connected time port changeover method is provided, including: a node which currently serves as a GM node transmitting time information via a first externally connected time port of the node; if the first externally connected time port fails, the node updating current node priority of the node and current GM node priority of the node as preset node priority, wherein the preset node priority is node priority configured for the node when the node is activated; and the node judging whether or not a second externally connected time port of the node is in an up state and whether priority of the second externally connected time port is higher than the current GM node priority of the node, and if the second externally connected time port of the node is in an up state and the priority of the second externally connected time port is higher than the current GM node priority of the node, then activating the second externally connected time port to transmit time information.

Preferably, after the node which currently serves as a GM node transmits the time information via the first externally connected time port of the node, the method further includes: determining that configuration of the priority of the first externally connected time port and/or the second externally connected time port has changed; and judging whether or not the second externally connected time port is in an up state and whether or not the currently configured priority of the first externally connected time port is lower than that of the second externally connected time port, and if the second externally connected time port is in the up state and the currently configured priority of the first externally connected time port is lower than that of the second externally connected time port, then activating the second externally connected time port to transmit the time information.

Preferably, before the node transmits the time information via the first externally connected time port, the method further includes: step 1, when the node is activated, configuring the node priority of the node and the GM node priority of the node as the preset node priority, and configuring priority of the first externally connected time port of the node and priority of the second externally connected time port of the node, step 2, the node determining that the first externally connected time port and the second externally connected time port are both in an up state, the priority of the first externally connected time port is higher than that of the second externally connected time port, and the priority of the first externally connected time port is higher than the current GM node priority of the node; and step 3, upgrading the node as a GM node, activating the first externally connected time port to transmit the time information, marking the second time port as de-activated, and updating the current node priority of the node and the current GM node priority of the node as the priority of the first externally connected time port.

Preferably, in step 2, the node determines that the first externally connected time port is in an up state and the second externally connected time port is in a blocked state, then the node judges whether the priority of the first externally connected time port is higher than the current GM node priority of the node, and if the priority of the first externally connected time port is higher than the current GM node priority of the node, then the node is upgraded as a GM node, the first externally connected time port is activated to transmit the time information, and the current node priority of the node and the current GM node priority of the node are updated as the priority of the first externally connected time port.

Preferably, before activating the second externally connected time port to transmit the time information, the method further includes: updating the current node priority of the node and the current GM node priority of the node as the priority of the second externally connected time port.

Preferably, after activating the second externally connected time port to transmit the time information, the method further includes: if all externally connected time ports of the node fail, updating the current node priority of the node and the current GM node priority of the node as the preset node priority, selecting a new GM node according to a best master clock (BMC) algorithm, and synchronizing to the new GM node.

Preferably, the node determines that the second externally connected time port is in a blocked state or the priority of the second externally connected time port is lower than the current GM node priority of the node; and the method further includes: according to a BMC algorithm, selecting a new GM node and synchronizing to the new GM node.

According to another aspect of the disclosure, an externally connected time port changeover device is provided, and the device includes: a transmission module, configured to transmit time information via a first externally connected time port of the node; an updating module, configured to, when the first externally connected time port fails, update current node priority of the node and current GM node priority of the node as preset node priority, wherein the preset node priority is node priority configured for the node when the node is activated; a judgment module, configured to judge whether or not a second externally connected time port of the node is in an up state and whether priority of the second externally connected time port is higher than the current GM node priority of the node, and if the second externally connected time port of the node is in the up state and the priority of the second externally connected time port is higher than the current GM node priority of the node, trigger a changeover module; and the changeover module, configured to set a state of the first externally connected time port as blocked and change over to the second externally connected time port to transmit the time information.

Preferably, the device further includes: a determination module, configured to, when the first time port has not failed, determine that configuration of the priority of the first externally connected time port and/or the second externally connected time port has changed, and if the configuration of the priority of the first externally connected time port and/or the second externally connected time port has changed, trigger the judgment module.

Preferably, the device further includes: a configuration module, configured to, when the node is activated, configure the node priority of the node and the GM node priority of the node as a preset node priority, and configure the priority of the first externally connected time port of the node and the priority of the second externally connected time port of the node; and a selection module, configured to, in the case of determining that the first externally connected time port and the second externally connected time port are both in an up state, the priority of the first externally connected time port is higher than that of the second externally connected time port, and the priority of the first externally connected time port is higher than the current GM node priority of the node, select the first externally connected time port to transmit the time information, trigger the updating module to mark the second time port as de-activated, and update the current node priority of the node and the current GM node priority of the node as the priority of the first externally connected time port.

Preferably, the selection module is further configured to, in the case of determining that the first externally connected time port is in an up state, the second externally connected time port is in a blocked state, and the priority of the first externally connected time port is higher than the current GM node priority of the node, select the first externally connected time port to transmit the time information and trigger the updating module to update the current node priority of the node and the current GM node priority of the node as the priority of the first externally connected time port.

Preferably, the updating module is further configured to, when the changeover module changes over to the second externally connected time port to transmit the time information, update the current node priority of the node and the current GM node priority of the node as the priority of the second externally connected time port.

Preferably, the device further includes: an execution module, configured to, when all externally connected time ports of the node fail, or some externally connected time ports fail and priorities of the remaining externally connected time ports are lower than the current GM node priority of the node, execute a BMC algorithm, select a new GM node, and synchronize to the new GM node.

By means of the disclosure, the manner of polling the port states of the current and other time access ports using software, intelligently querying and judging the state of the port and the priority thereof, and then transmitting time information by selecting a port with a higher priority or re-searching for a new GM node according to the BMC algorithm solves the problem that timely changeover cannot be performed among ports when the currently selected time access port has failed, thus improving the stability of the time synchronization network.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF THE EMBODIMENTS

The disclosure is described below with reference to the accompanying drawings and embodiments in detail. Note that, the embodiments of the disclosure and the features of the embodiments can be combined with each other if there is no conflict.

Figure 1:
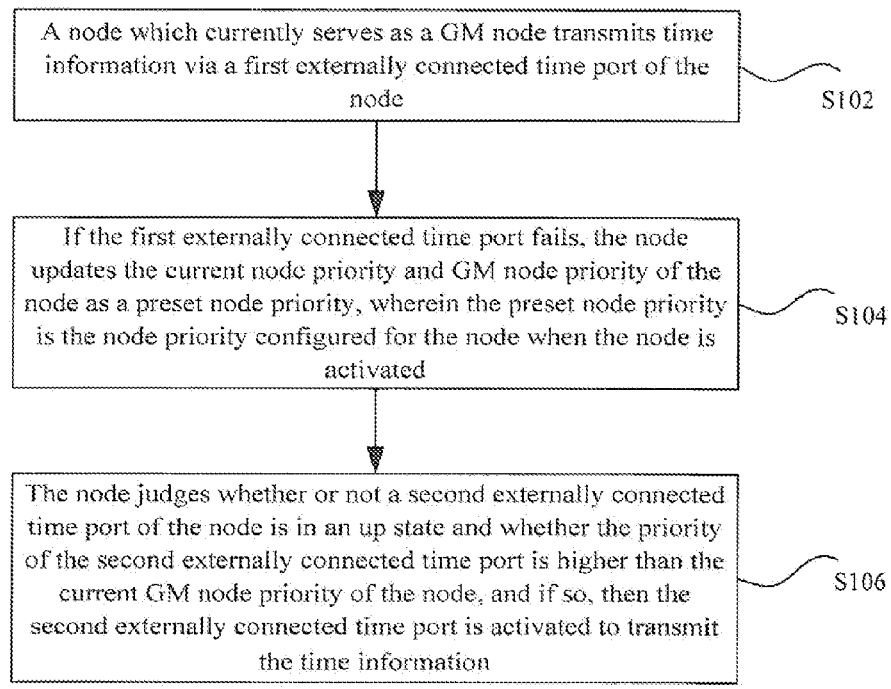
FIG. 1 is a flowchart of an externally connected time port changeover method according to an embodiment of the disclosure.

FIG. 1 is a flowchart of an externally connected time port changeover method according to an embodiment of the disclosure. As shown in FIG. 1, the method mainly includes steps S102 to S106.

In step S102, a node which currently serves as a GM node transmits time information via a first externally connected time port of the node.

For example, externally connected time ports which are connected with time resources can be provided on one or more nodes in the system. The priority of each externally connected time port on each node and the node priority of each node and GM node priority are configured by a network administrator, and in an initial state, the GM node priority of each node and the node priority are the same, and for the sake of description, this node priority is referred to as preset node priority. When the system starts up, each node can start up a port changeover algorithm and select an externally connected time port.

In the embodiments of the disclosure, taking a certain node which is provided with two externally connected time ports as an example, step S102 can be triggered in the following manner: when the node is activated, the node priority of the node and the GM node priority of the as the preset node priority are configured, and the priorities of the first externally connected time port and the second externally connected time port of the node are configured; the node judges whether the first externally connected time port and the second externally connected time port are both in an up state, if so, the node further judges whether the priority of the first externally connected time port is higher than that of the second externally connected time port and the priority of the first externally connected time port is higher than the current GM node priority of the node; if so, the node is upgraded as a GM node, the first externally connected time port is activated to transmit the time information, the second time port is marked as de-activated, and the current node priority and GM node priority of the node are updated as the priority of the first externally connected time port.

If is judged that the first externally connected time port is in an up state and the second externally connected time port is in a blocked state, then the node judges whether the priority of the first externally connected time port is higher than the current GM node priority of the node, if so, the node is upgraded as a GM node, the first externally connected time port is activated to transmit the time information, and the current node priority of the node and the GM node priority are updated as the priority of the first externally connected time port.

Figure 2:
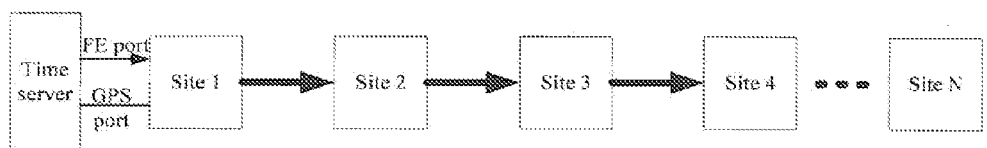
FIG. 2 is a schematic diagram of a time synchronization network introducing time information from an externally connected time port according to an embodiment of the disclosure.

For example, in FIG. 2, node 1 has two externally connected time ports: an FE port and a GPS port, when node 1 is activated, it is judged that the FE port and the GPS port are both in an up state, the priority of the FE port is higher than that of the GPS port, and the priority of the FE port is higher than the GM node priority of node 1 (at this moment, it is the node priority of node 1 in the initial state), node 1 selects the FE port to be used as an externally connected time port, marks the state of the GPS port as de-activated, and at the same time updates the node priority and GM priority as the port priority, node 1 is selected as a GM node, and the FE port is activated as the current time port to transmit the time information, and the subsequent nodes (node 2, . . . , node N) in the system perform time synchronization with node 1.

In step S104, the first externally connected time port fails, the node updates the current node priority and GM node priority of the node as the preset node priority, wherein the preset node priority is the node priority configured for the node when the node is activated.

Figure 3:
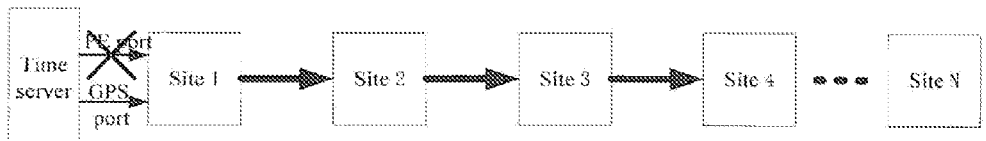
FIG. 3 is a schematic diagram of the changeover of an externally connected time port of a time synchronization network according to a preferred embodiment of the disclosure.

For example, in FIG. 3, the FE port has failed, the FE port is set as a blocked state, and the current node priority of node 1 and the GM node priority are updated as the preset node priority (i.e., the node priority initially configured for node 1).

In step S106, the node judges whether or not a second externally connected time port thereof is in an up state, wherein, the priority of the second externally connected time port is higher than the current GM node priority of the node, if so, activates the second externally connected time port to transmit the time information.

For example, in FIG. 3, the FE port of node 1 has failed, node 1 judges that the GPS port is in an up state and the priority of the GPS port is higher than the current GM node priority (it is currently the preset node priority) of node 1, and therefore, the GM priority of the node is updated as the priority of the GPS port, node 1 changes over to the GPS port, activates the GPS port to transmit the time information, that is, acquire time information from the GPS port, and synchronizes the other nodes in the system with this node by running 1588 protocol.

In the embodiments of the disclosure, when it is determined to aestivate the second externally connected time port to transmit the time information, for the sake of subsequent changeover, the current node priority of the node and the GM node priority can also be updated as the priority of the second externally connected time port.

After executing step S106, if all the externally connected time ports of this node have failed, the current node priority of the node and the GM node priority are updated as the preset node priority, a new GM node is selected according to the BMS (Best Master Clock) algorithm, and the other nodes in the system are synchronized with the new GM node (that is the new GM node) by running 1588 protocol.

Figure 4:
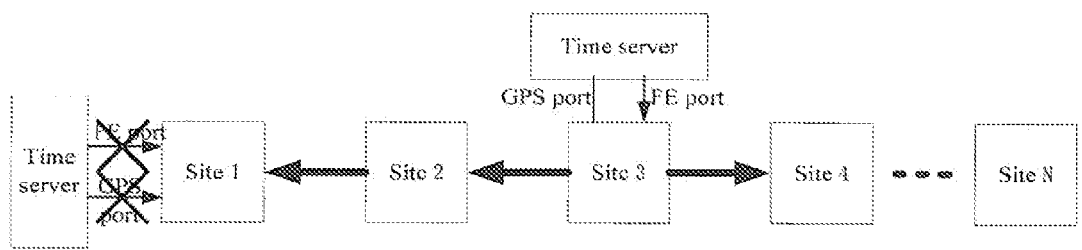
FIG. 4 is a schematic diagram of the changeover of an externally connected time port and an optical port of a time synchronization network according to a preferred embodiment of the disclosure.

For example, in FIG. 4, after node 1 changes over to the GPS port, the GPS port fails, and then node 1 activates the BMS algorithm and selects a new GM node for the system, and in FIG. 4, the new GM node is node 3, and node 1 becomes a slave node, node 3 acquires time information from the FE port which has a high priority, and the optical port becomes the time input port of node 1, and node 1 synchronizes to node 2 via the optical port.

In step S106, if it is judged that the second externally connected time port is in a blocked state or the priority of the second externally connected time port is lower than the current GM node priority of the node, according to the BMC algorithm, a new GM node can be selected and be synchronized to the new node.

In practical application, the changeover algorithm for synchronizing the externally connected time port of the time network is to run the port changeover algorithm when the currently selected time access port has failed on the basis of a time synchronization network which employs an externally connected time source to perform timing and runs the IEEE1588 protocol. This algorithm proceeds by controlling the up/down state of two externally connected time ports, configuring the priorities of the two ports by the network administrator and selecting a port according to the port state and the priority configured therefor by the network administrator as the current operating port to transmit the time information. The current port state is polled by software, when the currently selected port has failed, whether another externally connected time port is up is judged, if it is in an up state, the port priority and the node priority thereof are compared, if the port priority is higher, then it will change over to this port and introduce the time information from this port, and if the port priority is lower than the node priority, then this node runs freely, and a new GM node is searched in the network according to the BMS algorithm and the transmission of the time information is completed by the new GM node.

For example, in a preferred implementation of the disclosure, the time synchronization network acquiring time information from the externally connected time port can be realized by the following steps 1 to 7.

In step 1, one or more nodes in the system are connected externally to a time source, and the externally connected time port and node priority of each node can be configured by the network administrator.

In step 2, each node will activate the port changeover algorithm, if the externally connected time port of a certain node is in an up state and the port priority is higher than the GM node priority, then this node is upgraded as a GM node, the node priority and the GM node priority are updated as the current port priority, and this port is activated to transmit the time information to realize the time synchronization of the entire network.

In step 3, the system polls the operating state of the currently activated time port by means of software, if the current port state is not changed, then whether the configuration of the network administrator is changed is further judged, that is, whether the priority of each externally connected time port of this node has changed is judged, if yes, then whether the priority of the externally connected time port which acquires the time information currently is lower than the priorities of other externally connected time ports which are in an up state, if yes, then it will change over to the externally connected time port the port priority of which is highest in an up state, and if the configuration of the network administrator has not changed, then no operation will be done.

For example, at a certain moment, the two externally connected time ports (such as port A and port B) of the GM node are both in an up state, currently, the GM node transmits time information via time port A, and the configuration of the network administrator changes, so that the priority of port B is higher than that of port A, and therefore, the GM node changes over to port B and acquires time information via port B.

In step 4, if it is detected that the current operating port has failed, then port changeover calculation will be performed, firstly, the port which has failed currently is set as blocked, and at the same time the GM node is updated as the node priority, then whether the other port is in an up state is judged, if it is in an up state and the priority thereof is higher than the GM node priority, then the current node priority and the GM node priority are upgraded as the current port priority and this port is activated to transmit the time information, thus realizing changeover among externally connected time ports.

In step 5, if the priority of the selected port is lower than the GM priority, then the GM priority is updated using the node priority for rerunning the BMC algorithm, reselecting a GM node, and setting the selected port as a blocked state.

In step 6, when both of the two time ports have failed, the current GM priority is updated as the node priority, by way of running the BMC algorithm, reselecting a GM node in the network, time information access is realized by the new GM node, and at this moment, the original GM node becomes a slave node to complete the time synchronization of the GM node.

In step 7, step 1 is repeated.

Figure 5:
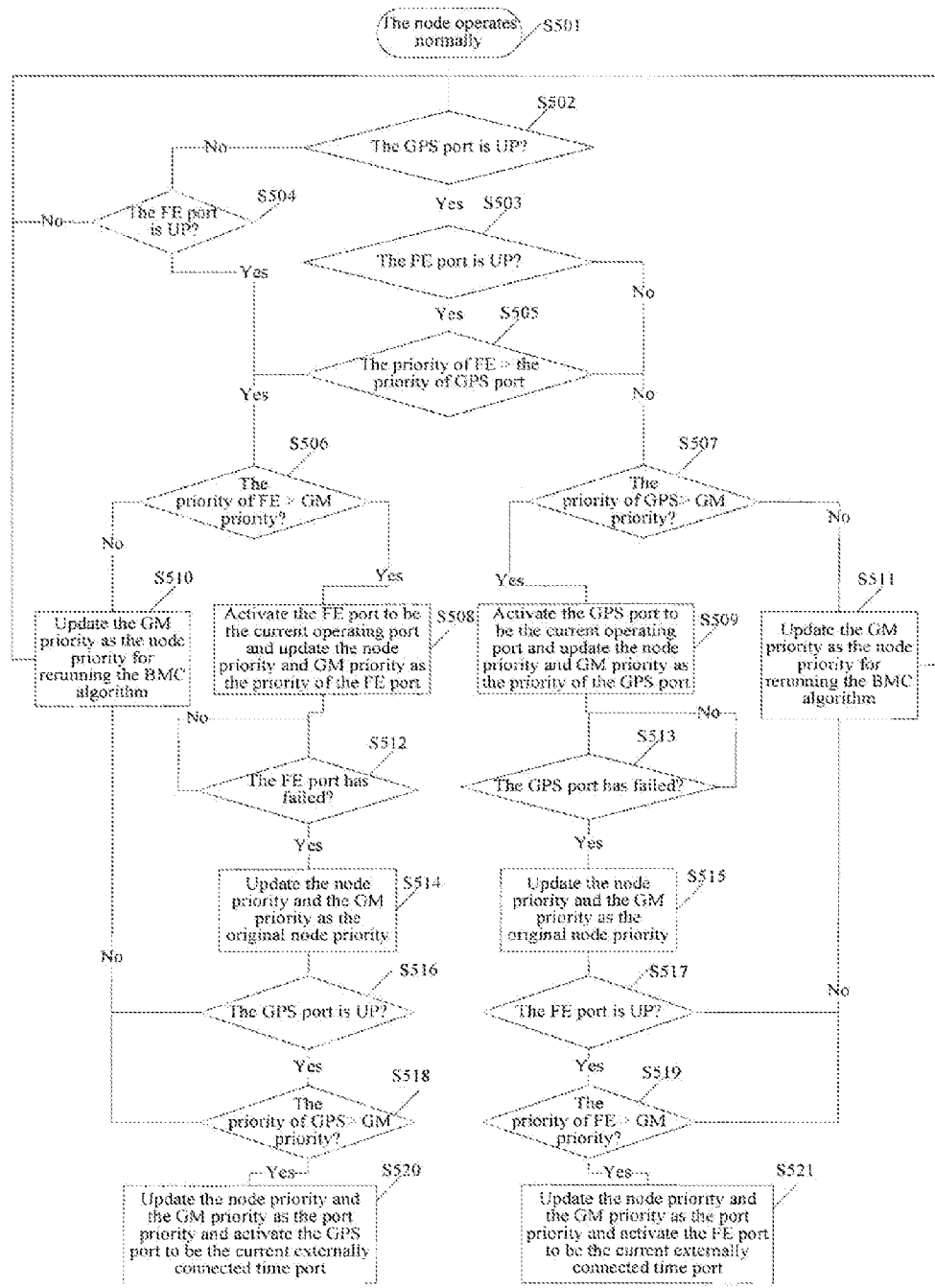
FIG. 5 is an implementation flowchart of an externally connected time port changeover method based on a time synchronization network according to an embodiment of the disclosure.

Hereinafter, taking that a certain node has two externally connected time ports: an FE port and a GPS port as an example, the externally connected time port changeover method based on a time synchronization network in the embodiments of the disclosure will be described, and as shown in FIG. 5, the changeover flowchart in this embodiment mainly includes the following steps (S501-S521).

In step S501, the current node is running normally.

In step S502, it is judged whether the GPS port of the current node is in an up state, if yes, then S503 is performed, otherwise, S504 is performed.

In step S503, it is judged whether the FE port of the current node is in an up state, if yes, then S505 is performed, otherwise, S507 is performed.

In step S504, it is judged whether the FE port of the current node is in an up state, if yes, then S506 is performed, otherwise, S502 is performed.

In step S505, it is judged whether the priority of the FE port of the current node is higher than the priority of the GPS port, if yes, then S506 is performed, otherwise, S507 is performed.

In step S506, it is judged whether the priority of the FE port of the current node is higher than the priority of the GM port, if yes, then S508 is performed, otherwise, S510 is performed.

In step S507, it is judged whether the GPS priority of the current node is higher than the priority of the GM node port, if yes, then S509 is performed, otherwise, S511 is performed.

In step S508, the FE port is activated as the current operating port, and the node priority and GM node priority are updated as the FE port priority.

In step S509, the GPS port is activated as the current operating port, and the node priority and GM node priority are updated as the GPS port priority.

In step S510, the priority of the GM node is updated as the node priority for rerunning the BMC algorithm, and then S502 is performed.

In step S511, the priority of the GM node is updated as the node priority for rerunning the BMC algorithm, and then S502 is performed.

In step S512, it is judged whether the FE port has failed, if yes, then S514 is performed, otherwise, S512 is performed repeatedly.

In step S513, it is judged whether the GPS port has failed, if yes, then S515 is performed, otherwise. S513 is performed repeatedly.

In step S514, the node priority and GM node priority are updated as the original node priority.

In step S515, the node priority and GM node priority are updated as the original node priority.

In step S516, it is judged whether the GPS port is in an up state, if yes, then S518 is performed, otherwise, S510 is performed.

In step S517, it is judged whether the FE port is in an up state, if yes, then S519 is performed, otherwise, S511 is performed.

In step S518, it is judged whether the GPS priority of the current node is higher than the GM node priority, if yes, then S520 is performed, otherwise, S510 is performed.

In step S519, it is judged whether the FE priority is higher than the GM node priority, if yes, then S521 is performed, otherwise, S511 is performed.

In step S520, the node priority and the GM node priority are updated as the port priority, and the GPS port is activated as the current externally connected time port.

In step S521, the node priority and the GM node priority are updated as the port priority, and the FE port is activated as the current externally connected time port.

Figure 6:
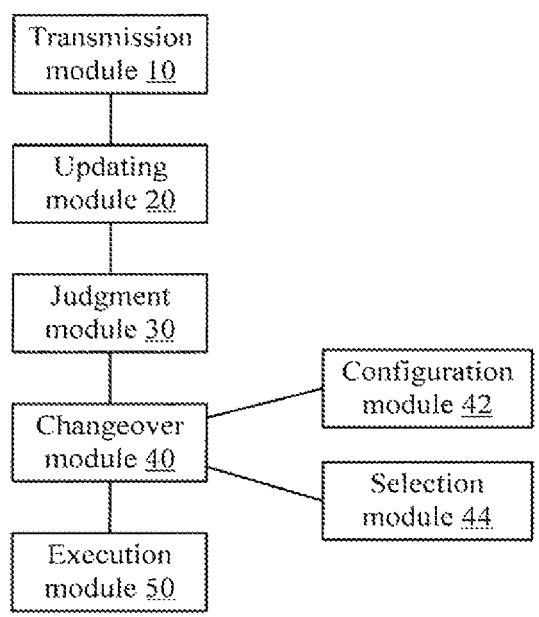
FIG. 6 is a structural schematic diagram of an externally connected time port changeover device according to an embodiment of the disclosure.

FIG. 6 is a structural schematic diagram of a device according to the embodiments of the disclosure, and as shown in FIG. 6, the changeover device mainly includes: a transmission module 10, an updating module 20, a judgment module 30 and a changeover module 40. The transmission module 10 is configured for transmitting time information via a first externally connected time port of the node; the updating module 20 is coupled with the transmission module 10 and is configured for, when the first externally connected time port has failed, updating the current node priority and GM node priority of the node as a preset node priority, wherein the preset node priority is the node priority configured for the node when the node is activated; the judgment module 30 is coupled with the updating module 29 and is configured for judging whether or not a second externally connected time port of the node is in an up state and whether the priority of the second externally connected time port is higher than the current. GM node priority of the node, and if it is, triggering the changeover module 40; and the changeover module 40 is coupled with the judgment module 30 and is configured for setting the state of the first externally connected time port as blocked and changing over to the second externally connected time port to transmit the time information.

In a preferred implementation of a preferred embodiment of the disclosure, the device further includes a determination module, which is configured for, when the first time port has not failed, determining that the priority configuration of the first externally connected time port and/or the second externally connected time port has changed, and if so, triggering the judgment module.

In a preferred embodiment of the disclosure, the changeover device 40 can further include: a configuration module 42 configured for, when the node is activated, configuring the node priority of the node and the GM node priority as a preset node priority, and configuring the priorities of the first externally connected time port and the second externally connected time port of the node; and a selection module 44 configured for, in the case of determining that the first externally connected time port and the second externally connected time port are both in an up state, the priority of the first externally connected time port is higher than that of the second externally connected time port, and the priority of the first externally connected time port is higher than the current GM node priority of the node, selecting the first externally connected time port to transmit the time information, triggering the updating module 20 to mark the second time port as de-activated, and updating the current node priority of the node and the GM node priority as the priority of the first externally connected time port.

The selection module 44 can be further configured for, in the case of determining that the first externally connected time port is in an up state, the second externally connected time port is in a blocked state, and the priority of the first externally connected time port is higher than the current GM node priority of the node, selecting the first externally connected time port to transmit the time information and triggering the updating module 20 to update the current node priority of the node and the GM node priority as the priority of the first externally connected time port. The updating module 20 can be farther configured for, when the changeover module 40 changes over to the second externally connected time port to transmit the time information, updating the current node priority of the node and the GM node priority as the priority of the second externally connected time port.

In a preferred embodiment of the disclosure, the changeover device can further include: an execution module 50, which execution module 50 is configured for, when all the externally connected time ports of the node have failed or some externally connected time ports have failed and the priorities of the remaining externally connected time ports are lower than the current GM node priority of the node, executing a BMC algorithm, selecting a new GM node, and synchronizing to the new node.

It can be seen from the above description that the disclosure realizes the following technical effects: by polling the states of the current and other externally connected time ports by means of software, when the current port has failed, the states and priorities of other externally connected time ports can be queried intelligently, and the externally connected time port changeover algorithm can be run to realize the changeover of the time access port, thus improving the stability of the time synchronization network.

Obviously, those skilled in the art shall understand that the above-mentioned modules and steps of the disclosure can be realized by using general purpose calculating device, can be integrated in one calculating device or distributed on a network which consists of a plurality of calculating devices. Alternatively, the modules and the steps of the disclosure can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the disclosure is not restricted to any particular hardware and software combination.

The descriptions above are only the preferable embodiment of the disclosure, which are not used to restrict the disclosure. For those skilled in the art, the disclosure may have various changes and variations. Any amendments, equivalent substitutions, improvements, etc. within the principle of the disclosure are all included in the scope of the protection of the disclosure.

What is claimed is:

1. An externally connected time port changeover method, comprising:
    transmitting, by a node which currently serves as a grand master (GM) node, time information via a first externally connected time port of the node;
    if the first externally connected time port fails, updating, by the node, a current node priority of the node and current GM node priority of the node as preset node priority, wherein the preset node priority is node priority configured for the node when the node is activated; and
    judging, the node, whether or not a second externally connected time port of the node is in an up state and whether priority of the second externally connected time port is higher than the current GM node priority of the node, and if the second externally connected time port of the node is in an up state and the priority of the second externally connected time port is higher than the current GM node priority of the node, then activating the second externally connected time port to transmit time information.

2. The method according to claim 1, wherein after the node which currently serves as the GM node transmits the time information via the first externally connected time port of the node, the method further comprises:
    determining that configuration of the priority of the first externally connected time port and/or the second externally connected time port has changed; and
    judging whether or not the second externally connected time port is in an up state and whether or not the currently configured priority of the first externally connected time port is lower than that of the second externally connected time port, and if the second externally connected time port is in the up state and the currently configured priority of the first externally connected time port is lower than that of the second externally connected time port, then activating the second externally connected time port to transmit the time information.

3. The method according to claim 2, wherein before activating the second externally connected time port to transmit the time information, the method further comprises;
updating the current node priority of the node and the current GM node priority of the node as the priority of the second externally connected time port.

4. The method according to claim 1, wherein before the node transmits the time information via the first externally connected time port, the method further comprises:
step 1, when the node is activated, configuring the node priority of the node and the GM node priority of the node as the preset rode priority, and configuring priority of the first externally connected time port of the node and priority of the second externally connected time port of the node;
step 2, determining, by the node, that the first externally connected time port and the second externally connected time port are both in an up state, the priority of the first externally connected time port is higher than that of the second externally connected time port, and the priority of the first externally connected time port is higher than the current GM node priority of the node; and
step 3, upgrading the node as a GM node, activating the first externally connected time port to transmit the time information, marking the second time port as de-activated, and updating the current node priority of the node and the current GM node priority of the node as the priority of the first externally connected time port.

5. The method according to claim 4, wherein in step 2, the node determines that the first externally connected time port is in an up state and the second externally connected time port is in a blocked state, then the node judges whether the priority of the first externally connected time port is higher than the current GM node priority of the node, and if the priority of the first externally connected time port is higher than the current GM node priority of the node, then the node is upgraded as a GM node, the first externally connected time port is activated to transmit the time information, and the current node priority of the node and the current GM node priority of the node are updated as the priority of the first externally connected time port.

6. The method according to claim 5, wherein before activating the second externally connected time port to transmit the time information, the method further comprises:
updating the current node priority of the node and the current GM node priority of the node as the priority of the second externally connected time port.

7. The method according to claim 4, wherein before activating the second externally connected time port to transmit the time information, the method further comprises:
updating the current node priority of the node and the current GM node priority of the node as the priority of the second externally connected time port.

8. The method according to claim 1, wherein before activating the second externally connected time port to transmit the time information, the method further comprises:
updating the current node priority of the node and the current GM node priority of the node as the priority of the second externally connected time port.

9. The method according to claim 8, wherein after activating the second externally connected time port to transmit the time information, the method further comprises:
if all externally connected time ports of the node fail, updating the current node priority of the node and the current GM node priority of the node as the preset node priority, selecting a new GM node according to a best master clock (BMC) algorithm, and synchronizing to the new GM node.

10. The method according to claim 1, wherein
determining, by the node, that the second externally connected: time port is in a blocked state or the priority of the second externally connected time port Is lower than the current GM node priority of the node; and
the method further comprises: according to a BMC algorithm, selecting a new GM node and synchronizing to the new GM node.

11. The method according to claim 1, wherein after activating the second externally connected time port to transmit the time information, the method further comprises:
if all externally connected time ports of the node fail, updating the current node priority of the node and the current GM node priority of the node as the preset node priority, selecting a new GM node according to a best master clock (BMC) algorithm, and synchronizing to the new GM node.

12. An externally connected time port changeover device located in a node, wherein the device comprises:
a transmission module, configured to transmit time information via a first externally connected time port of the node;
an updating module, configured to, when the first externally connected time port fails, update current node priority of the node and current grand master (GM) node priority of the node as preset node priority, wherein the preset node priority is node priority configured for the node when the node is activated;
a judgment module, configured to judge whether or not a second externally connected time port of the node is in an up state and whether priority of the second externally connected time port is higher than the current GM node priority of the node, and if the second externally connected time part of the node is in the up state and the priority of the second externally connected time port is higher than the current GM node priority of the node, trigger a changeover module; and
the changeover module, configured to set a state of the first externally connected time port as blocked and change over to the second externally connected time port to transmit the time information.

13. The device according to claim 12, further comprising: a determination module, configured to, when the first time port has not failed, determine that configuration of the priority of the first externally connected time port and/or the second externally connected time port has changed, and if the configuration of the priority of the first externally connected time port and/or the second externally connected time port has changed, trigger the judgment module.

14. The device according to claim 13, wherein the updating module is further configured to, when the changeover module changes over to the second externally connected time port to transmit the time information, update the current node priority of the node and the current GM node priority of the node as the priority of the second externally connected time port.

15. The device according to claim 12, further comprising:
a configuration module, configured to, when the node is activated, configure the node priority of the node and the GM node priority of the node as a preset node priority, and configure the priority of the first externally connected time port of the node and the priority of the second externally connected time port of the node; and a selection module, configured to, in the case of determining that the first externally connected time port and the second externally connected time port are both in an up state, the priority of the first externally connected time port is higher than that of the second externally connected time port, and the priority of the first externally connected time port is higher than the current GM node priority of the node, select the first externally connected time port to transmit the time information, trigger the updating module to mark the second time port as deactivated, and update the current node priority of the node and the current GM node priority of the node as the priority of the first externally connected time port.

16. The device according to claim 15, wherein the selection module is further configured to, in the case of determining that the first externally connected time port is in an up state, the second externally connected time port is in a blocked state, and the priority of the first externally connected time port is higher than the current GM node priority of the node, select the first externally connected time port to transmit the time information and trigger the updating module to update the current node priority of the node and the current GM node priority of the node as the priority of the first externally connected time port.

17. The device according to claim 16, wherein the updating module is further configured to, when the changeover module changes over to the second externally connected time port to transmit the time information, update the current node priority of the node and the current GM node priority of the node as the priority of the second externally connected time port.

18. The device according to claim 15, wherein the updating module is further configured to, when the changeover module changes over to the second externally connected time port to transmit the time information, update the current node priority of the node and the current GM node priority of the node as the priority of the second externally connected time port.

19. The device according to claim 12, wherein the updating module is further configured to, when the changeover module changes over to the second externally connected time port to transmit the time information, update the current node priority of the node and the current GM node priority of the node as the priority of the second externally connected time port.

20. The device according to claim 12, further comprising; an execution module, configured to, when all externally connected time ports of the node fail, or some externally connected time ports fail and priorities of the remaining externally connected time ports are lower than the current GM node priority of the node, execute a BMC algorithm, select a new GM node, and synchronize to the new GM node.

* * * * *